US007080364B2

(12) United States Patent
Tang et al.

(10) Patent No.: US 7,080,364 B2
(45) Date of Patent: Jul. 18, 2006

(54) METHODS AND APPARATUS FOR COMPILING A TRANSCENDENTAL FLOATING-POINT OPERATION

(75) Inventors: Ping T. Tang, Hayward, CA (US); Cristina S. Iordache, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 10/424,600

(22) Filed: Apr. 28, 2003

(65) Prior Publication Data

US 2004/0215676 A1    Oct. 28, 2004

(51) Int. Cl.
*G06F 9/45* (2006.01)

(52) U.S. Cl. .................................................. 717/140
(58) Field of Classification Search ................ 717/140; 708/204

See application file for complete search history.

(56) References Cited

U.S. PATENT DOCUMENTS

| | | | | |
|---|---|---|---|---|
| 5,365,465 A | * | 11/1994 | Larson | 708/204 |
| 6,502,118 B1 | * | 12/2002 | Chatterjee | 708/517 |
| 6,678,710 B1 | * | 1/2004 | Shankar et al. | 708/517 |
| 6,941,545 B1 | * | 9/2005 | Reese et al. | 717/130 |

OTHER PUBLICATIONS

Ping Tak Peter Tang, *Table-Lookup Algorithms for Elementary Functions and Their Error Analysis*, Proceedings of the 10$^{th}$ Symposium on Computer Arithmetic,Argonne National Laboratory-Mathematics and Computer Science Division, Argonne, Illinoois, (Jun. 1991) pp. 232-236.

Ramesh C. Agarwal et al, *New Scalar and Vector Elementary Functions For the IBM System /370*, IBM J. Res. Dev., vol. 30, No. 2 (Mar. 1986), pp. 126-139.

Ping Tak Peter Tang, *Table-Driven Implementation of the Exponential function in IEEE Floating-Point Arithmetic*, ACM Transactios on Mathematical Software, vol. 15, No. 2 (Jun. 1989), pp. 144-157.

* cited by examiner

*Primary Examiner*—John Chavis
(74) *Attorney, Agent, or Firm*—Hanley, Flight & Zimmerman, LLC

(57) ABSTRACT

Methods and an apparatus for compiling a transcendental floating-point operation are disclosed. The disclosed techniques compile a transcendental floating-point operation by replacing the transcendental floating-point operation with an integer-based routine (e.g., a single routine) hand-coded to perform the transcendental floating-point operation. Each of the instructions in the integer-based routine, including the integer operations, is compiled directly into opcodes without primitive floating-point emulation calls. As a result, function nesting is reduced and more efficient algorithms are used. The disclosed system does not simply emulate basic floating-point operations using integer operations. Instead, portions of the computation are isolated where fixed-point accuracy is sufficient and thus native integer computations can be used. For example, computing $(\log(1+Z)-Z)/Z$ instead of computing $\log(1+Z)$.

28 Claims, 6 Drawing Sheets

METHODS AND APPARATUS FOR COMPILING A TRANSCENDENTAL FLOATING-POINT OPERATION

TECHNICAL FIELD

The present disclosure pertains to software compilers and, more particularly, to methods and apparatus for compiling a transcendental floating-point operation.

BACKGROUND

Software compilers produce object code from source code. The source code includes a plurality of human readable instructions (e.g., If x>3 then y=log(x)). The object code produced from the source code includes a plurality of machine readable instructions (e.g., FF08AB12 . . . ). The machine readable instructions include opcodes and operands. An opcode is a number understood by a particular processor to mean a certain operation is to be performed (e.g., addition). An operand is data used in the operation (e.g., a number to be added to another number).

The opcodes that are generated by the compiler for the object code depend on what instructions are included in the source code. For example, a read operation has a different opcode than a write operation. In addition, the opcodes that are generated by the compiler depend on what type of processor is used by the target system. For example, the opcode for a read operation may be different from processor to processor.

Similarly, some processors may include native hardware that other processors do not include. For example, some processor architectures include an opcode for floating-point addition. When this opcode is encountered by the processor, the processor causes a floating-point unit (FPU) to execute the floating-point addition operation. However, other processors do not include a floating-point unit. As a result, these processor architectures do not include opcodes for floating-point operations.

Typically, prior-art compilers that encounter a transcendental floating-point function (e.g., log(x)) retrieve a plurality of instructions from a run-time library that include one or more primitive floating-point operations (e.g., floating-point addition, floating-point multiplication, etc.). The prior-art compiler then compiles the retrieved instructions. When the prior-art compiler encounters each primitive floating-point operation, the prior-art compiler typically uses one of two approaches based on the capabilities of the target processor. If the target processor includes a floating-point unit, the prior-art compiler typically generates the appropriate floating-point opcode.

However, if the prior-art compiler encounters a primitive floating-point operation (e.g., floating-point addition) associated with a transcendental floating-point function (e.g., log(x)), and the target processor does not include a floating-point unit, the prior-art compiler typically retrieves a primitive floating-point emulation function (e.g., emulation of floating-point addition) which includes one or more primitive integer-based operations (e.g., integer-based addition) from the run-time library. The prior-art compiler then compiles the newly retrieved instructions. When the prior-art compiler encounters each primitive integer-based operation, the prior-art compiler typically generates the appropriate integer opcode.

In this manner, the prior-art compiler is able to generate object code from source code that includes calls to transcendental floating-point functions for execution on target processors that do not include a floating-point unit. In addition, the only additional run-time library routines that are required for this approach are the primitive floating-point emulation functions (e.g., emulation of floating-point addition using integer-based addition).

However, this approach produces inefficient object code for several reasons. First, the nesting of function calls required by this approach produces a large number of overhead instructions (e.g., return from subroutine opcodes), thereby increasing the object code size. Similarly, the nesting of function calls required by this approach produces a large number of stack operations (e.g., pop return address from stack), thereby increasing object code execution time. For example, if a call to log(x) produces ten calls to floating primitives (e.g., floating point adds), and each call to a floating point primitive produces ten calls to integer-based emulation functions, the total number of subroutine calls is at least one hundred. In addition, the overall algorithm under this approach may be inefficient because the algorithm is not optimized for integer-based operations.

DETAILED DESCRIPTION

In general, the methods and apparatus described herein compile a transcendental floating-point operation by replacing the transcendental floating-point operation with an integer-based routine (e.g., a single routine) hand-coded to perform the transcendental floating-point operation. Each of the instructions in the integer-based routine, including the integer operations, is compiled directly into opcodes without primitive floating-point emulation calls. As a result, function nesting is reduced and more efficient algorithms are used. The disclosed system does not simply emulate basic floating-point operations using integer operations. Instead, portions of the computation are isolated where fixed-point accuracy is sufficient and thus native integer computations can be used. For example computing $(\log(1+Z)-Z)/Z$ instead of computing $\log(1+Z)$.

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, while the following disclosure is made with respect to example software compliers, it should be understood that many other compilers may alternatively be employed. Accordingly, while the following describes example systems and processes, persons of ordinary skill in the art will readily appreciate that the disclosed examples are not the only way to implement such systems.

Figure 1:
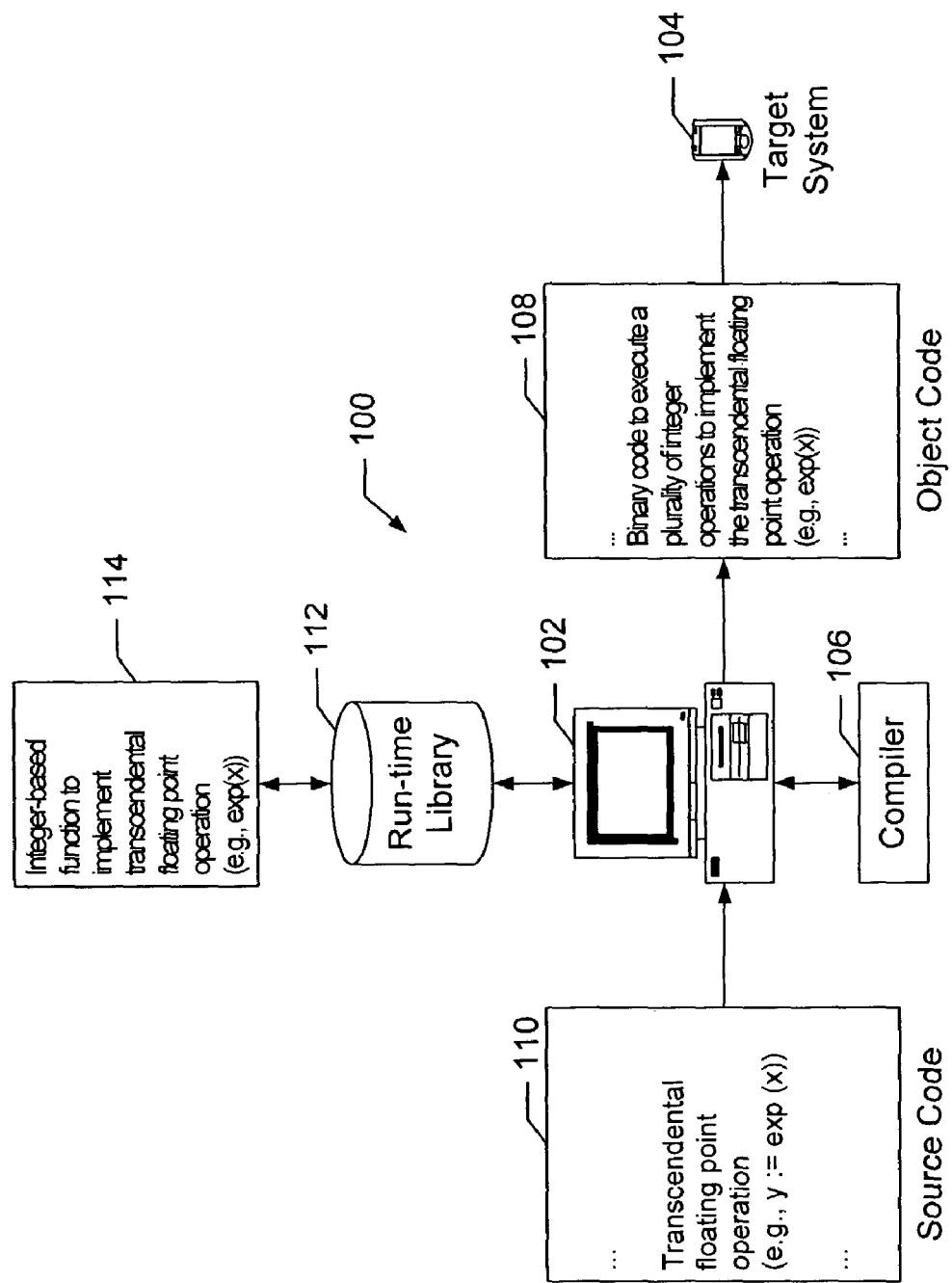
FIG. 1 is a block diagram illustrating an example environment of use for a compilation system and a target system.

A block diagram illustrating an example environment of use 100 for a compilation system 102 and a target system 104 is illustrated in FIG. 1. The compilation system 102 executes a compiler 106. The compiler 106 produces object code 108 from source code 110. The source code 110 includes a plurality of human readable instructions (e.g., if x>3 then y=log(x)). The object code 108 produced from the source code 110 includes a plurality of machine readable instructions (e.g., FF08AB12 . . . ). The values that are generated by the compiler 106 for the object code 108 depend on what instructions are included in the source code 110. In addition, the values that are generated by the compiler 106 for the object code 108 depend on what type of processor is used by the target system 104.

Often, function calls are included in the source code 110 that refer to functions that are not explicitly defined in the source code 110. Instead, these functions are defined in a run-time library 112. When the compiler 106 encounters such a function call, the compiler 106 retrieves a plurality of instructions that comprise the function from the run-time library 112 and compiles those instructions. These external functions may be nested. For example, function A may call function B, wherein both function A and function B are retrieved from the run-time library.

When the compiler 106 encounters a transcendental floating-point function (e.g., log(x)) in the source code 110, the compiler 106 retrieves an integer-based function 114 to perform the entire transcendental floating-point function from the run-time library 112. The integer-based function 114 includes a plurality of instructions that include one or more primitive integer-based operations. For example, the integer-based function 114 may include integer addition instructions and/or integer multiplication instructions. The compiler 106 then compiles the retrieved instructions. When the compiler 106 encounters each primitive integer operation, the compiler 106 generates the appropriate integer opcode.

In this manner, the compiler 106 is able to generate object code 108 from source code 110 that includes calls to transcendental floating-point functions for execution on target processors 306 that do not include a floating-point unit. In addition, the disclosed techniques may use hand-coded integer-based functions 114 to perform the transcendental floating-point operations. Each of the instructions in the integer-based functions 114 are compiled directly into opcodes without primitive floating-point emulation calls. As a result, function nesting is reduced and more efficient algorithms may be used.

Figure 2:
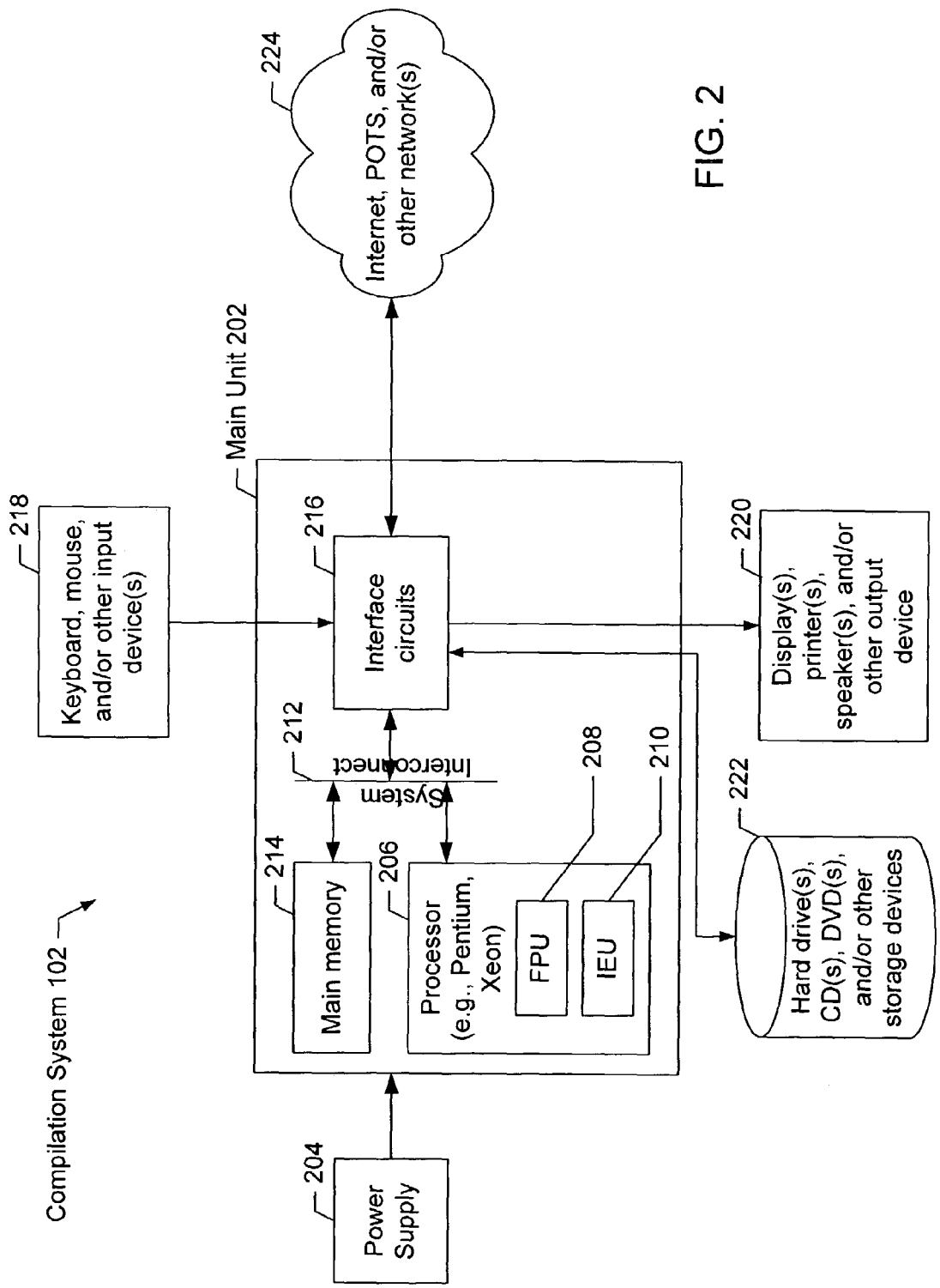
FIG. 2 is a block diagram illustrating an example compilation system.

A block diagram of an example compilation system 102 which may be used to compile software programs is illustrated in FIG. 2. The compilation system 102 may be a personal computer (PC) or any other computing device. The compilation system 102 illustrated includes a main processing unit 202 powered by a power supply 204. The main processing unit 202 includes a processor 206. In this example, the processor 206 includes a floating-point unit (FPU) 208 and an integer execution unit (IEU) 210. The floating-point unit 208 and/or the integer execution unit 210 may be internal or external to the processor 206.

The floating-point unit 208 is hardware structured to perform a plurality of floating-point operations. For example, the floating-point unit 208 may be structured to perform primitive floating-point operations such as floating-point addition, subtraction, multiplication, and/or division. Similarly, the floating-point unit 208 may be structured to perform transcendental floating-point operations such as exp(x), log(x), sin(x), cos(x), tan(x), and atan(x). By using hardware instead of software to perform floating-point operations, processing speed is increased.

The integer execution unit 210 is hardware structured to perform a plurality of integer (or fixed-point) operations. For example, the integer execution unit 210 may be structured to perform primitive integer operations such as integer addition, subtraction, multiplication, and/or division. Typically, an integer execution unit 210 is not structured to perform transcendental operations such as exp(x), log(x), sin(x), cos(x), tan(x), and atan(x).

The processor 206 is electrically coupled by a system interconnect 212 to a main memory device 214 and one or more interface circuits 216. In this example, the system interconnect 212 is an address/data bus. Of course, a person of ordinary skill in the art will readily appreciate that interconnects other than busses may be used to connect the processor 206 to the main memory device 214. For example, one or more dedicated lines may be used to connect the processor 206 to the main memory device 208.

The processor 206 may include any type of well known processing unit, such as a microprocessor from the Intel® Pentium™ family of microprocessors, the Intel® Itanium™ family of microprocessors, and/or the Intel® Xeon™ family of processors. In addition, the processor 206 may include any type of well known cache memory, such as static random access memory (SRAM). The main memory device 214 may include dynamic random access memory (DRAM), but may also include non-volatile memory. In an example, the main memory device 214 stores a compiler 106 which is executed by the processor 206 to compile a source code software program 110 into an object code software program 108.

The interface circuit(s) 216 may be implemented using any type of well known interface standard, such as an Ethernet interface and/or a Universal Serial Bus (USB) interface. One or more input devices 218 may be connected to the interface circuits 216 for entering data and commands into the main processing unit 202. For example, an input device 218 may be a keyboard, mouse, touch screen, track pad, track ball, isopoint, and/or a voice recognition system.

One or more displays, printers, speakers, and/or other output devices 220 may also be connected to the main processing unit 202 via one or more of the interface circuits 216. The display 220 may be cathode ray tube (CRTs), liquid crystal displays (LCDs), or any other type of display. The display 220 may generate visual indications of data generated during operation of the main processing unit 202. The visual displays may include prompts for human operator input, compiled software programs, calculated values, detected data, etc.

The compilation system 102 may also include one or more storage devices 222. For example, the compilation system 102 may include one or more hard drives, a compact disk (CD) drive, a digital versatile disk drive (DVD), and/or other computer media input/output (I/O) devices. In an example, the storage device 222 stores source code 110 to be compiled, a compiler 106, a run-time library 112, and object code 108 after the source code 110 is compiled by the compiler 106.

The computer system 100 may also exchange data with other devices via a connection to a network 224. The network connection may be any type of network connection, such as an Ethernet connection, digital subscriber line (DSL), telephone line, coaxial cable, etc. The network 224 may be any type of network, such as the Internet, a telephone network, a cable network, and/or a wireless network. The computer system 100 may receive source code 110, compiler programs 106, run-time library 112 components, and/or any other type of data via the network 224. Similarly, the computer system 100 may transmit object code 108 and/or any other type of data via the network 224.

Figure 3:
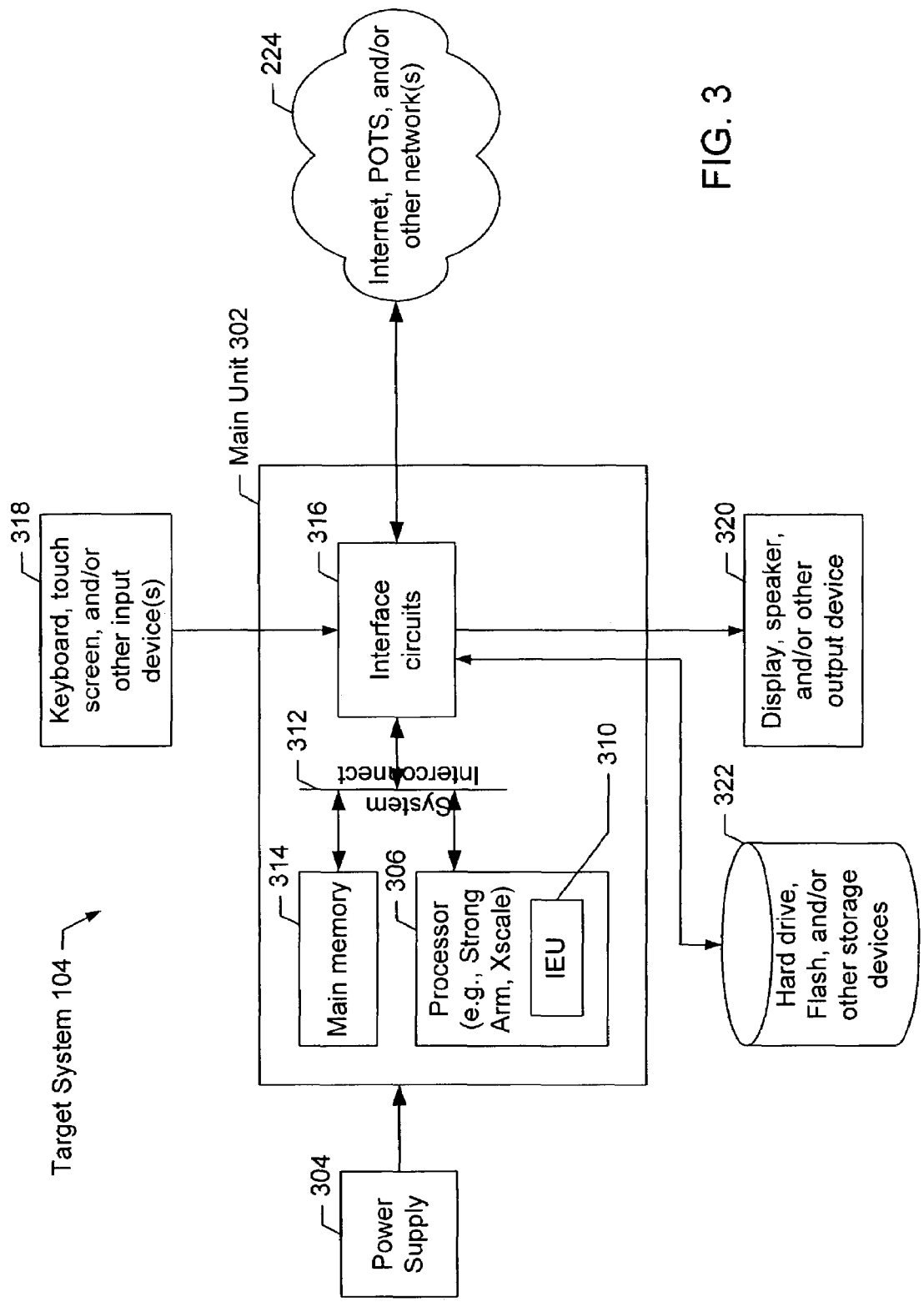
FIG. 3 is a block diagram illustrating an example target system.

A block diagram of an example target system 104 which may be used to run compiled software programs is illustrated in FIG. 3. The target system 104 may be a personal digital assistant (PDA) or any other computing device. The illustrated target system 104 includes a main processing unit 302 powered by a power supply 304. The main processing unit 302 includes a processor 306. In this example, the processor 306 includes an integer execution unit (IEU) 310. However, the processor 306 does not include a floating-point unit (FPU). The integer execution unit 310 may be internal or external to the processor 306.

The integer execution unit 310 is hardware structured to perform a plurality of integer (or fixed-point) operations. For example, the integer execution unit 310 may be structured to perform primitive operations such as integer addition, subtraction, multiplication, and/or division. Typically, an integer execution unit 310 is not structured to perform transcendental operations such as exp(x), log(x), sin(x), cos(x), tan(x), and atan(x).

The processor 306 is electrically coupled by a system interconnect 312 to a main memory device 314 and one or more interface circuits 316. In this example, the system interconnect 312 is an address/data bus. Of course, a person of ordinary skill in the art will readily appreciate that interconnects other than busses may be used to connect the processor 306 to the main memory device 314. For example, one or more dedicated lines may be used to connect the processor 306 to the main memory device 308.

The processor 306 may include any type of well known processing unit, such as a microprocessor from the Intel® Xscale™ family of microprocessors and/or the Intel StrongARM™ family of microprocessors. In addition, the processor 306 may include any type of well known cache memory, such as static random access memory (SRAM). The main memory device 314 may include dynamic random access memory (DRAM), but may also include non-volatile memory. In an example, the main memory device 314 stores object code 108 which is executed by the processor 306.

The interface circuit(s) 316 may be implemented using any type of well known interface standard, such as an Ethernet interface and/or a Universal Serial Bus (USB) interface. One or more input devices 318 may be connected to the interface circuits 216 for entering data and commands into the main processing unit 302. For example, an input device 318 may be a keyboard, mouse, touch screen, track pad, track ball, isopoint, and/or a voice recognition system.

One or more displays, printers, speakers, and/or other output devices 320 may also be connected to the main processing unit 302 via one or more of the interface circuits 316. The display 320 may be cathode ray tube (CRTs), liquid crystal displays (LCDs), or any other type of display. The display 320 may generate visual indications of data generated during operation of the main processing unit 302. The visual displays may include prompts for human operator input, programs, calculated values, detected data, etc.

The target system 104 may also include one or more storage devices 322. For example, the target system 104 may include one or more hard drives, a compact disk (CD) drive, a digital versatile disk drive (DVD), and/or other computer media input/output (I/O) devices. In an example, the storage device 322 stores object code 108. The computer system 100 may also exchange data with other devices via a connection to the network 224.

Figure 4:
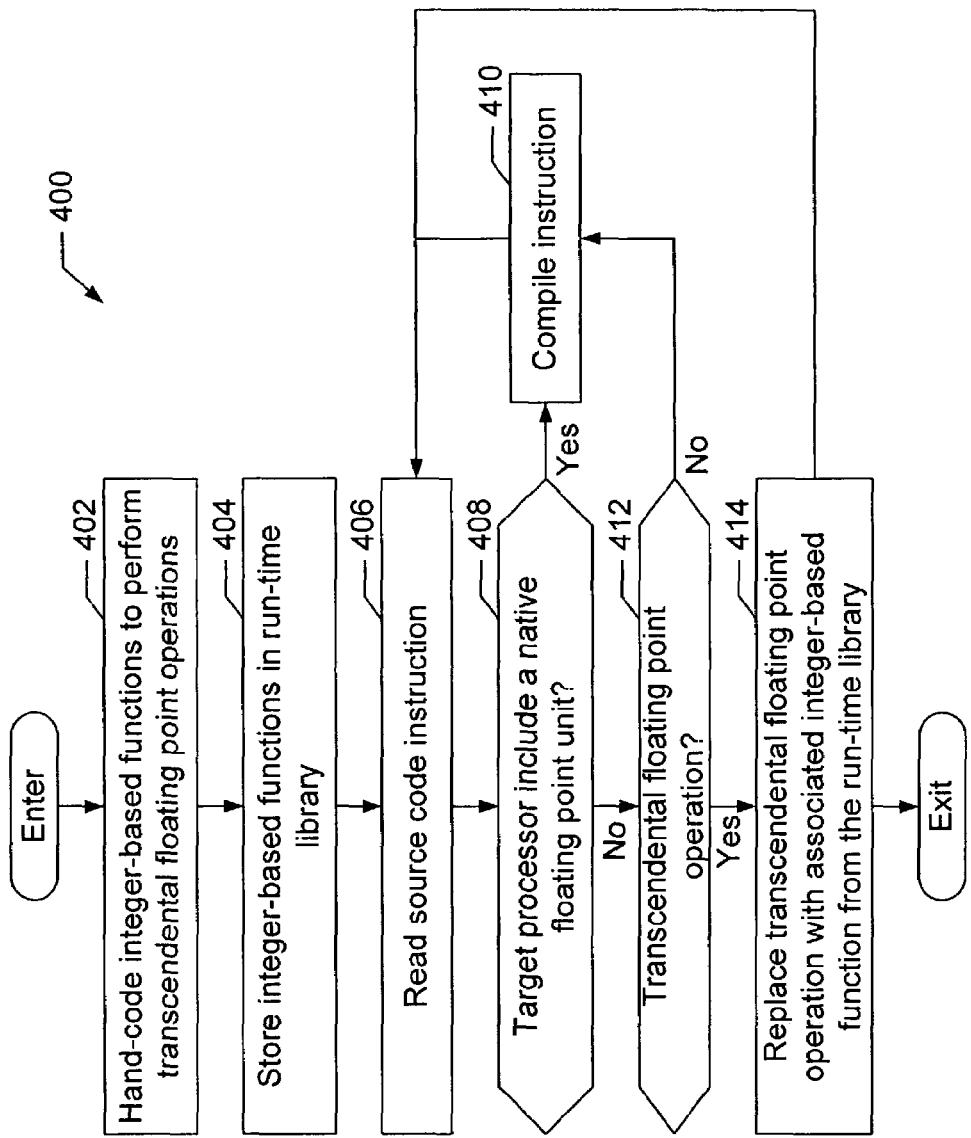
FIG. 4 is a flowchart representative of machine readable instructions which may be executed by a device to implement an example method of compiling a transcendental floating-point operation.

An example process 400 for compiling a transcendental floating-point operation is illustrated in FIG. 4. Preferably, the process 400 is embodied in one or more software programs which are stored in one or more memories and executed by one or more processors (e.g., processor 206) in a well known manner. However, some or all of the blocks of the process 400 may be performed manually and/or by another hardware device. Although the process 400 is described with reference to the flowchart illustrated in FIG. 4, a person of ordinary skill in the art will readily appreciate that many other methods of performing the process 400 may be used. For example, the order of many of the blocks may be altered, the operation of one or more blocks may be changed, blocks may be combined, and/or blocks may be eliminated.

In general, the example process 400 compiles a transcendental floating-point operation by replacing the transcendental floating-point operation with an integer-based function 114 (e.g., a single routine) hand-coded to perform the transcendental floating-point operation. Each of the instructions in the integer-based function 114, including the integer operations, is compiled directly into opcodes without primitive floating-point emulation calls. As a result, function nesting is reduced and more efficient algorithms are used. The disclosed system does not simply emulate basic floating-point operations using integer operations. Instead, portions of the computation are isolated where fixed-point accuracy is sufficient and thus native integer computations can be used. For example, computing $(\log(1+Z)-Z)/Z$ instead of computing $\log(1+Z)$.

Figure 5:
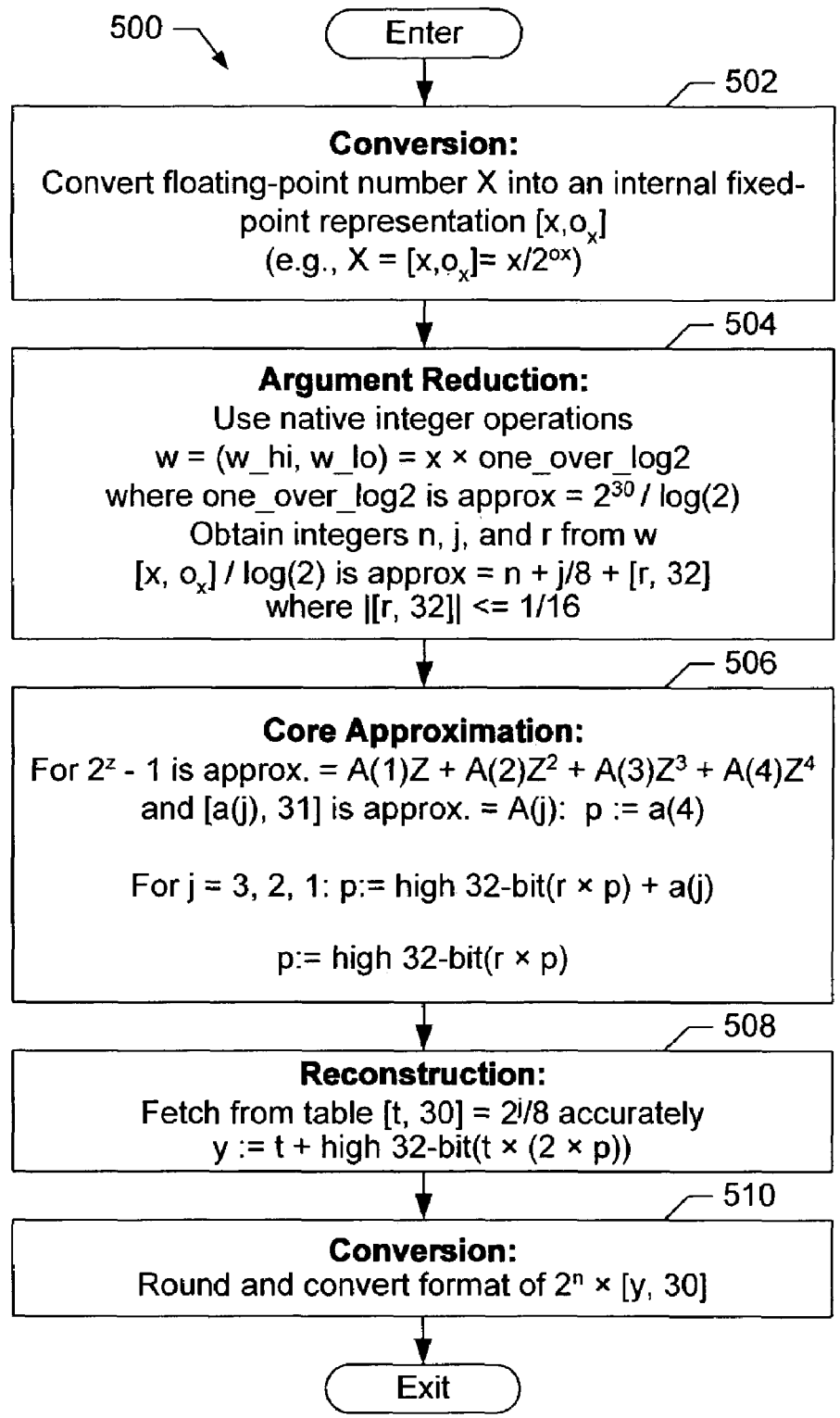
FIG. 5 is a flowchart representative of machine readable instructions which may be executed by a device to implement an example of an integer-based exp(x) function.
Figure 6:
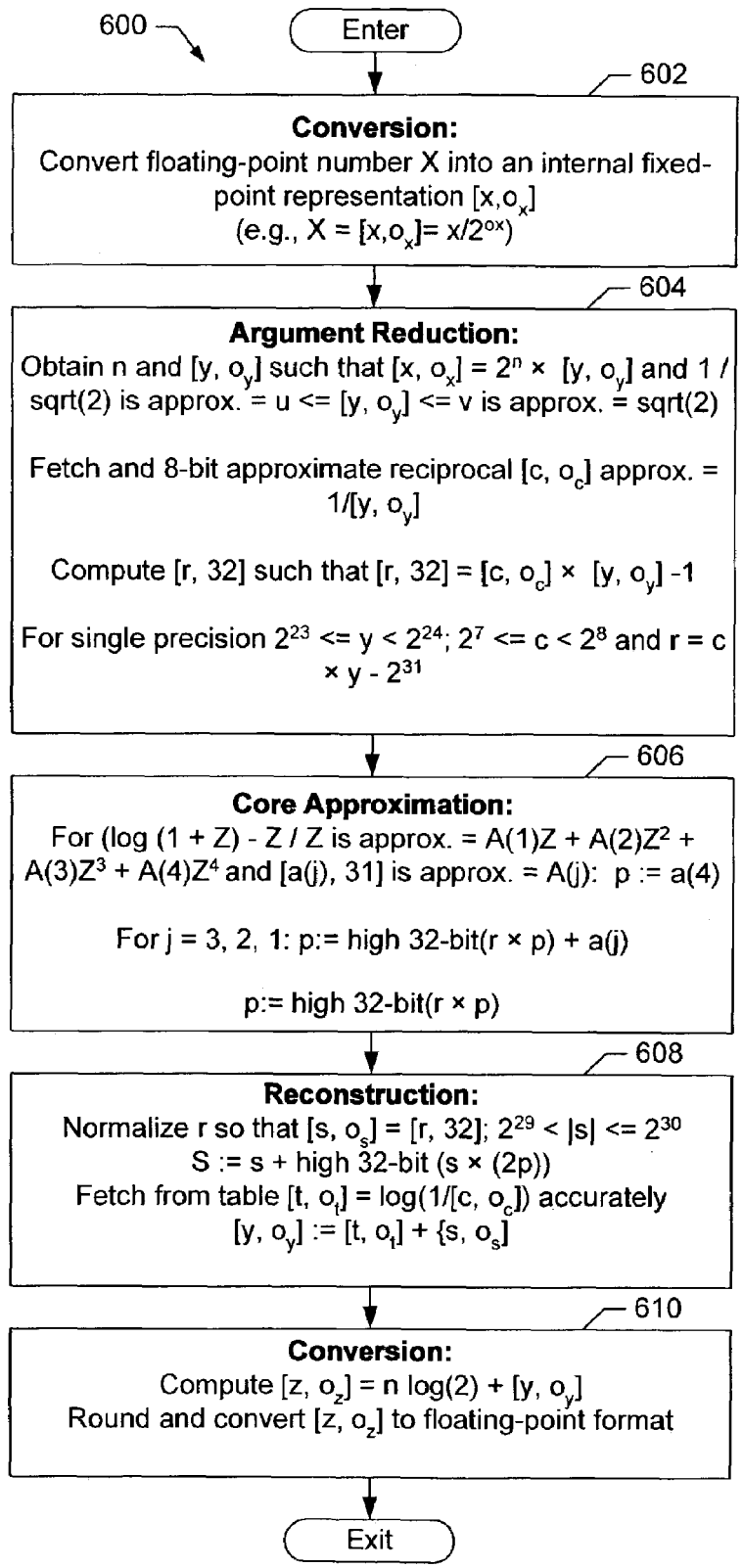
FIG. 6 is a flowchart representative of machine readable instructions which may be executed by a device to implement an example of an integer-based log(x) function.

The example process 400 begins when a programmer or a team of programmers constructs one or more integer-based functions 114 to perform one or more transcendental floating-point operations (block 402). An integer-based function 114 is a function that uses integer operations to perform a function directly. An integer-based function 114 does not use floating-point operations layered on top of integer operations. Preferably, these integer-based functions 114 are hand-coded to ensure an efficient algorithm is used. Transcendental floating-point operations include exp(x), log(x), sin(x), cos(x), tan(x), and atan(x) operations performed on one or more floating-point numbers. A flowchart illustrating an integer-based function 114 to perform an exp(x) function is illustrated in FIG. 5 and is described in detail below. A flowchart illustrating an integer-based function 114 to perform a log(x) function is illustrated in FIG. 6 and is described in detail below. Once constructed, the integer-based functions 114 are stored in a run-time library in a well known manner (block 404).

Subsequently, one or more instructions from a source code program 110 are read into the compiler 106 (block 406). The compiler 106 may check if the target processor (e.g., processor 306) includes a floating-point unit (block 408). For example, the compiler 106 may be executed via a command line instruction that includes one or more program switches (e.g., compile application.src-n). A switch is a variable (e.g., -n) passed to a program (e.g., compile) when the program is executed that informs the program of a certain mode of execution beyond the normal input file (e.g., application.src). Alternatively, the compiler 106 may have a setup file and/or a preferences window that allows a user to indicate if the target processor (e.g., processor 306) includes a floating-point unit.

If the target processor includes a floating-point unit, the compiler 106 compiles the instruction normally (block 410). In other words, if the target processor includes a floating-point unit, the compiler 106 compiles the instruction even if doing so would generate floating-point calls. If the target processor does not include a floating-point unit, the compiler 106 determines if the current instruction is a transcendental floating-point operation (block 412). If the current instruction is not a transcendental floating-point operation, the compiler 106 compiles the instruction normally (block 410). However, if the current instruction is a transcendental floating-point operation, the compiler 106 retrieves a corresponding integer-based function 114 from the run-time library 112 and replaces the transcendental floating-point operation with the integer-based function 114 (block 414).

Once a transcendental floating-point operation is replaced with a corresponding integer-based function 114, the process 400 reads the first instruction of the integer-based function 114 (block 406). This time through the process 400, the test to determine if the current instruction is a transcendental floating-point operation (block 412) will take the no branch, and the compiler 106 will compile the instruction normally (block 410). This process 400 continues until the entire source code program 110 is compiled with integer-based functions 114 replacing one or more of the transcendental floating-point operations.

An example integer-based exp(x) function 500 is illustrated in FIG. 5. Preferably, the function 500 is embodied in one or more software programs which are stored in one or more memories (e.g., 112, 214, and/or 314) and executed by one or more processors (e.g., processor 306) in a well known manner. However, some or all of the blocks of the function 500 may be performed manually and/or by another hardware device. Although the function 500 is described with reference to the flowchart illustrated in FIG. 5, a person of ordinary skill in the art will readily appreciate that many other methods of performing the function 500 may be used. For example, the order of many of the blocks may be altered, the operation of one or more blocks may be changed, blocks may be combined, and/or blocks may be eliminated.

In general, the example integer-based exp(x) function 500 assumes a 32-bit integer architecture. The example integer-based exp(x) function 500 begins by converting the floating-point argument "x" into an integer-based fixed-point representation $x/2^{ox}$ in a well known manner (block 502). The argument is then reduced using native integer operations (block 504). A simple approximation to a function such as exp(X) by standard mathematical approximation such as a truncated Taylor series expansion may require a long series because X can be large in magnitude. Accordingly, X may be transformed into an argument of limited magnitude by finding the "distance" from X to a closest integer multiple of the value log(2). Thus, X=n log(2)+F. This guarantees |F|<=log(2)/2. The mathematical relationship of exp(A+B)=exp(A) exp(B) implies that exp(X)=exp(n log(2))* exp(F) $=2^n$*exp(F), thereby reducing the problem to that of computing the exp function on a limited range of [−log(2)/2 log(2)/2].

A generalized form of this technique is to express X/log (2) as an integer n, integer multiple of "eighths" j/8, and a remainder Z no larger than 1/16 in magnitude thus: X/log(2) =n+j/8+Z, |Z|<=1/16. It may be sufficient to compute Z to a predetermined absolute accuracy in order to deliver a final approximation to exp(X) that is within a predetermined relative accuracy. Thus, Z can be computed via a native integer approximation.

For example, using standard integer multiplication of the integer representation x with one_over_log2: x*one_over_log2=(w_hi, w_lo). The least significant bit of the product corresponds to the value of $2^{-(ox+30)}$. Considering only |X|<128 otherwise exp(X) may overflow or underflow. An index calculation leads to extraction of n, j, and r where the least significant bit of r corresponds to $2^{-32}$ and approximates Z. Thus |Z−r/2^(32)|<=2^−33 (approximately) and r/2^32 approximates Z to a predetermined absolute (fixed-point) accuracy.

A core approximation is then computed (block 506). Since exp(X)=2^(X/log(2))=2^(n+j/8+Z)=2^n*2^(j/8)*2^Z, computing exp(X) is reduced to computing each of these three components. Computing $2^n$ only involves integer addition to the exponent field of a floating-point representation. The values of 2^(j/8) can be computed beforehand and stored in memory because there are only eight possibilities j=−4, −3, . . . , 3. Computing 2^Z is of the form 1+alpha_1Z+alpha_2 Z^2+etc. Accordingly, 2^Z−1 is computed. As is well known, an approximating polynomial can be obtained through numerical software that offers sufficient accuracy over the range in question of Z in [−1/16, 1/16]. In this example, a degree-4 polynomial suffices (A(1)Z+A(2)Z^2+A(3)Z^3+A(4)Z^4). This computation is represented in fixed-point arithmetic as follows. Each A(j) is represented by a(j) where a(j)/2^31 is approximately A(j). Thus, a(4)/2^31 is approximately A(4). By assigning p:=a(4), p/2^31 approximates A(4). Because r/2^32 approximates Z, the high 32-bit of r*a(4) approximates A(4)Z*2^31. Thus, by assigning p:=high-32-bit(r*p), p/2^31 approximates A(4)*Z. Next, by assigning p:=p+a(3), p/2^31 approximates A(3)+A(4)*Z. Similarly, the next step p:=high-32-bit(r*p) yields p/2^31 approximates A(3)*Z+A(4)*Z^2. At the end of the loop, we have p/2^31 approximating A(1)Z+A(2)Z^2+ . . . +A(4)Z^4. Because fixed-point calculations are used, |p/2^31−(A(1)Z+A(2)Z^2+A(3)Z^3+A(4)Z^4|<=abs_err where abs_err is bounded by approximately 2^−31.

Next, a reconstruction is performed (block 508). Now that an approximation of 2^Z−1 is computed, 2^(j/8)*2^Z is approximated via 2^(j/8)+2^(j/8)*(2^Z−1). The value 2^(j/8) is stored as an integer t such that the least significant bit corresponds to 2^−30. Left shifting p by 1 bit gives an approximation to (2^Z−1)*2^32. Hence, high 32-bit(t*(2*p)) gives an approximation to 2^(j/8)*(2^Z−1)*2^(30). So the computation y:=t+high 32-bit(t*(2*p)) gives y such that y/2^30 approximates 2^(j/8)+2^(j/8)*(2^Z−1)=2^(j/8)*2^Z.

Finally, the result of the integer-based exp(x) function 500 is converted to a floating-point result (block 510). By eliminating variable length shifting and explicit exponent calculations, the integer-based exp(x) function 500 is more efficient than typical floating-point calculations.

An example integer-based log(x) function 600 is illustrated in FIG. 6. Preferably, the function 600 is embodied in one or more software programs which are stored in one or more memories (e.g., 112, 214, and/or 314) and executed by one or more processors (e.g., processor 306) in a well known manner. However, some or all of the blocks of the function 600 may be performed manually and/or by another hardware device. Although the function 600 is described with reference to the flowchart illustrated in FIG. 6, a person of ordinary skill in the art will readily appreciate that many other methods of performing the function 600 may be used. For example, the order of many of the blocks may be altered, the operation of one or more blocks may be changed, blocks may be combined, and/or blocks may be eliminated.

In general, the example integer-based log(x) function 600 assumes a 32-bit integer architecture. The example integer-based log(x) function 600 begins by converting the floating-point argument "x" into an integer-based fixed-point representation $x/2^{\alpha x}$ in a well known manner (block 602). The argument is then reduced using native integer operations (block 604). For example, given an IEEE floating-point value of X, it may be naturally decomposed to the form $X=2^n*Y$, where $1<=Y<2$. Thus, log(X) may be computed using the relationship $\log(X)=\log(2^n*Y)=n*\log(2)+\log(Y)$. This reduces the problem to computing the log function on the interval [1, 2].

This method has a numerical defect when the input argument X is slightly below 1. In this case, n will be −1, but Y will be very close to 2, and much of the significant accuracy computed in log(Y) will be cancelled out by $n*\log(2)=-\log(2)$. The well known method to avoid this problem is to obtain a representation such that Y is never very close to 2, decompose X into $2^n*Y$, $1<=Y<2$. If $Y>=\text{sqrt}(2)$, and then set $n:=n+1$; $Y:=Y/2$. In this manner, $1/\text{sqrt}(2)<=Y<=\text{sqrt}(2)$.

The first step of the fixed-point implementation is to obtain this representation in the integer format $[x, o\_x]=2^n*[y, o\_y]$, where $[y, o\_y]$ is never very close to 2 $u<=[y, o\_y]<=v$; where u is approximately $1/\text{sqrt}(2)$; and where v is approximately $\text{sqrt}(2)$.

To further reduce the problem of computing $\log([y, o\_y])$, an argument reduction step may be applied to exploit the fact that an approximation of the log function is simplified if the argument is close to 1. Similarly, computing $\log(1+Z)$ is simplified when Z is small in magnitude.

The logarithm of a product is the sums of the logarithm $(\log(Y)=\log(Y*C/C)=\log(1/C)+\log(Y*C)=\log(1/C)+\log(1+(Y*C-1)))$. If C is close to 1/Y, $Y*C-1$ will be small in magnitude. In this example, a table including $C=[c, o\_c]$ is stored that is close to the inverse of a set of equally distributed points in the interval [u, v]. In addition, the values of log(1/C) may be computed beforehand and stored in a table. The scaling of y and c imply that $Z=Y*C-1$ corresponds to $r=y*c-2^{31}$. Moreover, because $2^{23}<=y<2^{24}$ and $2^7<=c<2^8$, $y*c-2^{31}$ can be computed in 32-bit integer arithmetic.

A core approximation is then computed (block 606). If a fixed-point polynomial computation is used on an approximation to $\log(1+Z)$, the result is a value P that has an absolute error. However, since $\log(1+Z)$ can be close to zero, the computed value P would result in very large relative error.

When $\log(1+Z)$ is small, its value is close to that of Z. Thus, by obtaining a computed value of $P=(\log(1+Z)-Z)/Z$ to an absolute error, $\log(1+Z)$ is computed to high relative accuracy as long as $Z+Z*P$ is performed in a way that relative accuracy is preserved. In one example, a degree-4 polynomial $A(1)Z+A(2)Z^2+A(3)Z^3+A(4)Z^4$ is used to compute $[\log(1+Z)-Z]/Z$. As described above, the computed p has the property that $|p/2^{31}-(A(1)Z+A(2)Z^2+A(3)Z^3+A(4)Z^4|<=\text{abs\_err}$, where abs_err is bounded by approximately $2^{-31}$.

Next, a reconstruction is performed to compute $\log(Y)=\log(1/C)+\log(1+Z)$ (block 608). First, $\log(1+Z)=Z+Z*[(\log(1+Z)-Z)/Z]$ is determined. In order to preserve relative precision, r is normalized to $[s,o\_s]=[r, 32]$, with $2^{29}<|s|<=2^{30}$. In this manner, the most significant bits of $s*(2p)$ are preserved in the high 32-bit result. Thus, v=high 32-bit($s*(2*p)$) yields a value $[v,o\_s]=\log(1+Z)-Z$, and $[s+v, o\_s]=\log(1+Z)$. Next, the value of log(1/C) is fetched from a table $[t, o\_t]$. The value $[t, o\_t]$ and $[s+v, o\_s]$ are then added together to give a value $[y, o\_y]=\log(Y)$.

Finally, the result of the integer-based log(x) function 600 is converted to a floating-point result (block 610). More specifically, integer multiplication and additions are performed to obtain $n*\log(2)+[y, o\_y]$. By eliminating variable length shifting and explicit exponent calculations, the integer-based log(x) function 600 is more efficient than typical floating-point calculations.

Although certain methods, apparatus, and articles of manufacture have been described herein, the scope of coverage of this patent is not limited thereto. On the contrary, this patent covers all apparatus, methods, and articles of manufacture fairly falling within the scope of the appended claims either literally or under the doctrine of equivalents.

What is claimed is:

1. A method of compiling a transcendental floating-point operation, the method comprising:
  reading a plurality of source code instructions including the transcendental floating-point operation;
  retrieving a predetermined integer-based function to perform the transcendental floating-point operation in response to reading the transcendental floating-point operation; and
  compiling the plurality of source code instructions to produce an object code, the object code including instructions based on the predetermined integer-based function.

2. A method as defined in claim 1, further comprising determining that a target processor does not include a native floating-point unit.

3. A method as defined in claim 1, wherein retrieving the predetermined integer-based function comprises retrieving the predetermined integer-based function from a run-time library.

4. A method as defined in claim 3, wherein retrieving the predetermined integer-based function from the run-time library comprises retrieving a hand-coded software function.

5. A method as defined in claim 3, wherein retrieving the predetermined integer-based function from the run-time library comprises retrieving a hand-coded software function structured to perform the floating-point operation using no floating-point instructions.

6. A method as defined in claim 1, further comprising storing the predetermined integer-based function.

7. A method as defined in claim 6, wherein storing the predetermined integer-based function comprises storing at least one of an exponential function and a logarithmic function.

8. A method as defined in claim 6, wherein storing the predetermined integer-based function comprises storing at least one of a sine function using no floating-point instructions, a cosine function using no floating-point instructions, and a tangent function using no floating-point instructions.

9. A method as defined in claim 1, wherein basic floating-point operations are not emulated using integer operations.

10. A method as defined in claim 1, wherein portions of the transcendental floating-point operation are isolated where fixed-point accuracy is sufficient.

11. A method of compiling a transcendental floating-point operation for a target processor, the method comprising:
  reading a plurality of source code instructions including the transcendental floating-point operation; and
  compiling the plurality of source code instructions to produce an object code, the object code including instructions based on a predetermined integer-based function structured to perform the transcendental floating-point operation if the target processor does not include a native floating-point unit, the object code excluding instructions based on the predetermined integer-based function if the target processor does include a native floating-point unit.

12. A method as defined in claim 11, further comprising determining that the target processor does not include a native floating-point unit.

13. A method as defined in claim 12, further comprising retrieving the predetermined integer-based function in response to reading the transcendental floating-point operation.

14. A method as defined in claim 11, further comprising storing the predetermined integer-based function.

15. A method as defined in claim 14, wherein storing the predetermined integer-based function comprises storing the predetermined integer-based function in a run-time library.

16. A method as defined in claim 14, wherein storing the predetermined integer-based function comprises storing a hand-coded software function structured to perform the floating-point operation using no floating-point instructions.

17. A method as defined in claim 14, wherein storing the predetermined integer-based function comprises storing at least one of an exponential function and a logarithmic function.

18. A method as defined in claim 14, wherein storing the predetermined integer-based function comprises storing at least one of a sine function, a cosine function, a tangent function and an inverse tangent function.

19. A method as defined in claim 14, wherein storing the predetermined integer-based function comprises storing the predetermined integer-based function using no floating-point instructions.

20. An apparatus for compiling a transcendental floating-point operation, the apparatus comprising:
   a first memory device to store a run-time library, the run-time library including a predetermined integer-based function structured to perform the transcendental floating-point operation;
   a second memory device to store a plurality of source code instructions including the transcendental floating-point operation; and
   a processor operatively coupled to the first memory device and the second memory device, the processor being structured to compile the plurality of source code instructions to produce an object code, the object code including instructions based on the predetermined integer-based function.

21. An apparatus as defined in claim 20, wherein the first memory device comprises the second memory device.

22. An apparatus as defined in claim 20, wherein the processor is structured to include instructions in the object code based on the predetermined integer-based function if a target processor does not include a native floating-point unit.

23. An apparatus as defined in claim 20, wherein the run-time library includes a plurality of functions hand-coded to use no floating-point instructions.

24. An apparatus as defined in claim 23, wherein the plurality of functions hand-coded to use no floating-point instructions includes an exponential function, a logarithmic function, a sine function, a cosine function, a tangent function, and an inverse tangent function.

25. A machine readable medium storing instructions structured to cause a machine to: read a plurality of source code instructions including a transcendental floating-point operation; lookup a predetermined integer-based function structured to perform the transcendental floating-point operation; retrieve the predetermined integer-based function from a run-time library; and compile the plurality of source code instructions to produce an object code, the object code including instructions based on the predetermined integer-based function.

26. A machine readable medium as defined in claim 25, wherein the instructions are further structured to cause the machine to read data indicating a target processor does not include a native floating-point unit.

27. A machine readable medium as defined in claim 25, further comprising the run-time library, the run-time library including a plurality of functions to perform a plurality of transcendental floating-point operations without using floating-point instructions.

28. A machine readable medium as defined in claim 25, wherein the instructions are further structured to cause the machine compile the plurality of source code instructions without instructions based on the predetermined integer-based function if a target processor includes a native floating-point unit.

* * * * *